(12) United States Patent
Gao et al.

(10) Patent No.: US 11,868,098 B2
(45) Date of Patent: Jan. 9, 2024

(54) CHILLER AND PUMP CONTROL USING CUSTOMIZABLE ARTIFICIAL INTELLIGENCE SYSTEM

(71) Applicant: Phaidra, Inc., Seattle, WA (US)

(72) Inventors: Jim Jingyue Gao, Silverdale, WA (US); Vedavyas Panneershelvam, Burnaby (CA); Katherine Elizabeth Hoffman, Silverdale, WA (US); Paritosh Mohan, London (GB); Christopher R. Vause, Austin, TX (US)

(73) Assignee: Phaidra, Inc., Seattle, WA (US)

( * ) Notice: Subject to any disclaimer, the term of this patent is extended or adjusted under 35 U.S.C. 154(b) by 0 days.

(21) Appl. No.: 17/525,694

(22) Filed: Nov. 12, 2021

(65) Prior Publication Data

US 2023/0152756 A1  May 18, 2023

(51) Int. Cl.
G05B 13/02 (2006.01)
G05B 13/00 (2006.01)
G06N 5/022 (2023.01)

(52) U.S. Cl.
CPC .......... G05B 13/028 (2013.01); G05B 13/00 (2013.01); G05B 13/024 (2013.01); G06N 5/022 (2013.01)

(58) Field of Classification Search
None
See application file for complete search history.

(56) References Cited

U.S. PATENT DOCUMENTS

| | | | | | |
|---|---|---|---|---|---|
| 3,593,744 | A | * | 7/1971 | Smith | E03B 11/04 138/30 |
| 3,786,922 | A | * | 1/1974 | Materese | E03D 9/10 210/136 |
| 3,944,770 | A | * | 3/1976 | Pepper | H01H 35/186 200/84 R |
| 5,711,483 | A | * | 1/1998 | Hays | B05B 12/085 417/15 |

(Continued)

FOREIGN PATENT DOCUMENTS

KR   20180115146 A   10/2018

OTHER PUBLICATIONS

"DeepMind AI Reduces Google Data Centre Cooling Bill by 40%", Jul. 20, 2016, https://www.deepmind.com/blog/deepmind-ai-reduces-google-data-centre-cooling-bill-by-40.

(Continued)

*Primary Examiner* — Bernard G Lindsay
(74) *Attorney, Agent, or Firm* — Jeffrey Schox; Diana Lin

(57) ABSTRACT

Methods and systems are disclosed for determining a plan to optimize key performance indicators (KPIs) of an industrial process. Such a plan is determined based on generating a query for information associated with the KPIs and based on receiving user-provided object information corresponding to the KPIs. The method includes receiving, at a user interface, one or more KPIs associated with an industrial process. The method includes generating, based on the one or more KPIs, at least one query for information associated with the KPI. The method includes receiving, at the user interface, a response to the at least one query. The method includes determining, by an artificial intelligence agent, a plan for optimizing the KPI.

33 Claims, 5 Drawing Sheets

(56) References Cited

U.S. PATENT DOCUMENTS

| | | | | |
|---|---|---|---|---|
| 6,053,703 | A * | 4/2000 | Kawaguchi | F04C 14/08 |
| | | | | 318/807 |
| 10,311,507 | B2 | 6/2019 | Stausholm et al. | |
| 2002/0038336 | A1* | 3/2002 | Abileah | G06F 9/547 |
| | | | | 707/999.107 |
| 2002/0046294 | A1* | 4/2002 | Brodsky | G06F 9/541 |
| | | | | 709/217 |
| 2003/0171851 | A1* | 9/2003 | Brickfield | H02J 3/008 |
| | | | | 700/286 |
| 2004/0049295 | A1* | 3/2004 | Wojsznis | G05B 11/32 |
| | | | | 700/19 |
| 2005/0137727 | A1* | 6/2005 | Feuerbach | G05B 19/4093 |
| | | | | 700/87 |
| 2007/0059838 | A1* | 3/2007 | Morrison | F25J 3/0219 |
| | | | | 436/55 |
| 2008/0003120 | A1* | 1/2008 | Meza | F04B 43/026 |
| | | | | 417/413.1 |
| 2008/0082302 | A1* | 4/2008 | Samardzija | G05B 23/021 |
| | | | | 703/2 |
| 2008/0319936 | A1* | 12/2008 | Wong | G06N 5/00 |
| | | | | 706/47 |
| 2013/0066471 | A1* | 3/2013 | Wang | E21B 44/00 |
| | | | | 700/275 |
| 2016/0357886 | A1* | 12/2016 | Fralick | G06F 8/38 |
| 2018/0279636 | A1* | 10/2018 | Poos | A23B 4/285 |
| 2019/0030544 | A1* | 1/2019 | Kratzer, III | B02C 18/0092 |
| 2019/0129395 | A1* | 5/2019 | Niemiec | G05B 23/0235 |
| 2020/0233384 | A1* | 7/2020 | Iwane | G06N 3/006 |
| 2020/0379452 | A1* | 12/2020 | Yamaguchi | G05B 19/41865 |
| 2021/0197275 | A1* | 7/2021 | Sohn | B23K 31/125 |
| 2021/0278957 | A1* | 9/2021 | Canneto | G06F 40/216 |
| 2021/0365840 | A1* | 11/2021 | Park | G06N 20/10 |
| 2021/0379552 | A1* | 12/2021 | Shimoni | G05B 13/042 |

OTHER PUBLICATIONS

"Safety-first AI for autonomous data centre cooling and industrial control", https://www.deepmind.com/blog/safety-first-ai-for-autonomous-data-centre-cooling-and-industrial-control, Aug. 17, 2018.

Gao, Jim, "AI assistance for plant operators", Phaidra, downloaded Dec. 22, 2022.

Gao, Jim, "Machine Learning Applications for Data Center Optimization", Google (2014), https://static.googleusercontent.com/media/research.google.com/en//pubs/archive/42542.pdf.

Silver, David, et al., "Mastering the game of Go with deep neural networks and tree search", Nature, vol. 529, Jan. 28, 2016.

* cited by examiner

CHILLER AND PUMP CONTROL USING CUSTOMIZABLE ARTIFICIAL INTELLIGENCE SYSTEM

TECHNICAL FIELD

This specification relates to the analysis of industrial process data by an artificial intelligence system to provide a plan to optimize key performance indicator (KPI) data to a domain expert.

BACKGROUND

Today, artificial intelligence (AI) systems have been adopted by entities spanning a number of different industries, with AI systems applied to optimize and predict features defined by the entities. Typically, these entities have been large enterprise organizations with the associated resources (e.g., funding, technical expertise, etc.) that are necessary to design and implement AI systems. As a result, smaller entities, as well as entities without a clearly defined use for AI systems have thus far been deterred from applying AI to their business needs. For both types of entities, this may be attributed to a lack of infrastructure for AI systems. These entities may also lack the expertise necessary to define their business objectives in AI terms and apply an AI system to optimize their business objectives. However, even existing AI systems managed by enterprise organizations can be ineffective, as the individuals responsible for designing the AI systems lack the knowledge held by domain level experts that are engaged with the entity's business objectives. Further, existing AI systems are often limited to predicting features defined by the entities, lacking capabilities to make decisions corresponding to the predicted features.

In some cases, an entity's business objectives may correspond to an industrial process, where the industrial process is controlled by a system that measures at least one key performance indicator (KPI). Accordingly, the domain level experts associated with the industrial process are the individuals best suited to supply an AI system with corresponding objective functions and parameters to optimize a KPI. But, the domain level experts typically lack the expertise to adequately apply their knowledge to an AI system. As such, entities are in need of solutions to enable domain experts to apply their system level knowledge to an AI system to optimize the KPI(s) associated with the industrial process. Further, solutions may need to be accessible for individuals that lack experience in configuring and maintaining AI systems.

SUMMARY

Particular implementations of the subject matter described in this specification can realize one or more of the following advantages. The system can aggregate system defining information for an industrial process from one or more end users. System defining information can include at least one KPI associated with the industrial process. The system can query a user for information associated with the KPI, including process variables, objective functions, and system information associated with the KPI, where the system information can include equipment and operating constraints that are a part of the industrial process. In some cases, based on the received information from the user, the system can repeatedly query the user for information associated with the KPI. Based on the received information associated with the KPI and the industrial process, the system can determine an ability to optimize the KPI according to the received information and can determine one or more process variable setpoints that will optimize the KPI (if implemented) according to the received information. The system can use an artificial intelligence agent to optimize the KPI and evaluate the capability of the system to optimize the KPI.

In general, one aspect of the subject matter described in this specification can be embodied in methods that include the actions of receiving, at a user interface, one or more key performance indicator (KPI) associated with an industrial process; generating, based on the KPI, at least one query for information associated with the KPI; receiving, at the user interface, a response to the at least one query; and determining, by an artificial intelligence agent, a plan for optimizing the KPI. Other embodiments of this aspect include corresponding systems, apparatus, and computer programs.

These and other aspects can optionally include one or more of the following features. The KPI can comprise at least one of energy usage, quality (e.g., product quality), yield (e.g., product yield), and process stability (e.g., industrial process stability). The industrial process can comprise at least one of a data center process, an HVAC process, a chemical manufacturing process, a heating and cooling process, a pharmaceutical manufacturing process, an oil and gas manufacturing process, a paper and pulp manufacturing process, a metal manufacturing process, a cement manufacturing process, a glass manufacturing process, and a power generation process. In some implementations, the first receiving step can further comprise receiving at the user interface, system characteristic information associated with one or more equipment that enable the industrial process. In some cases, the system characteristic information can comprise one or more of: a configuration of the equipment and sensors associated with the equipment. In some cases, the at least one query for information associated with the KPI can be based on both the KPI and the system characteristic information. In some cases, the method can also include receiving historical KPI data for the industrial process.

In some implementations, the response to the at least one query can comprise process information. In some cases, the method can also include generating at least one additional query based on the received process information. In some cases, the process information can comprise one or more of an objective function that measures the KPI, a process variable associated with the objective function, and a constraint for the process variable. In some cases, the process information can further comprise an indication of how the objective function is measured. The process information can further comprise an indication that the objective function is measurable by one or more equipment that enable the industrial process. In some cases, the method can also include generating a query for a configuration of the one or more equipment; and receiving, at the user interface, the configuration. The process information can further comprise an indication of whether the process variable is directly configured by the user or indirectly configured by the one or more equipment. The process information can also further comprise an indication of whether the constraint is local to a subset of the one or more equipment or global to the one or more equipment.

In some implementations, the process information can further comprise an indication of whether the constraint is statically independent of the industrial process or dynamically dependent on the industrial process. The process information can further comprise an indication of whether the process variable is dependent on any additional process variables. The process information can further comprise an indication of whether the constraint may be violated during the industrial process. In some cases, the method can also include determining, from the process information (e.g., and using a dimensionality reduction), one or more effective process variable for optimizing the objective function. In some cases, the method can also include causing display, at the user interface, of the effective process variable.

In some implementations, the artificial intelligence agent can comprise a reinforcement learning agent, a neural network model, or a neural network model and search algorithm. The plan for optimizing the KPI can comprise a user action. In some cases, the method can also include causing display, at the user interface, of the user action. The method can also include determining a capability of the artificial intelligence agent (e.g., to optimize the KPI). In some cases, the method can also include causing display, at the user interface, of an indication of the capability of the artificial intelligence agent (e.g., to optimize the KPI).

In some cases, another aspect of the subject matter described in this specification can be embodied in a system. The system can include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Industrial processes may include a number of parameters, functions, and equipment. Accordingly, domain level experts that manage an industrial process are some of the most knowledgeable individuals regarding operation of the industrial process. But, these domain level experts have been unable to apply their knowledge to AI systems for reasons as described herein, As will be described in detail below, new data aggregation, interpretation, and optimization techniques are introduced as a solution to optimizing one or more KPIs of an industrial process via a configurable AI system. This description will often refer to industries involving industrial processes and, in particular, industrial process with measurable KPIs; however, in other implementations, the concepts and inventions described herein can be used in other applications, as well.

Embodiments of an Optimization System

Figure 1:
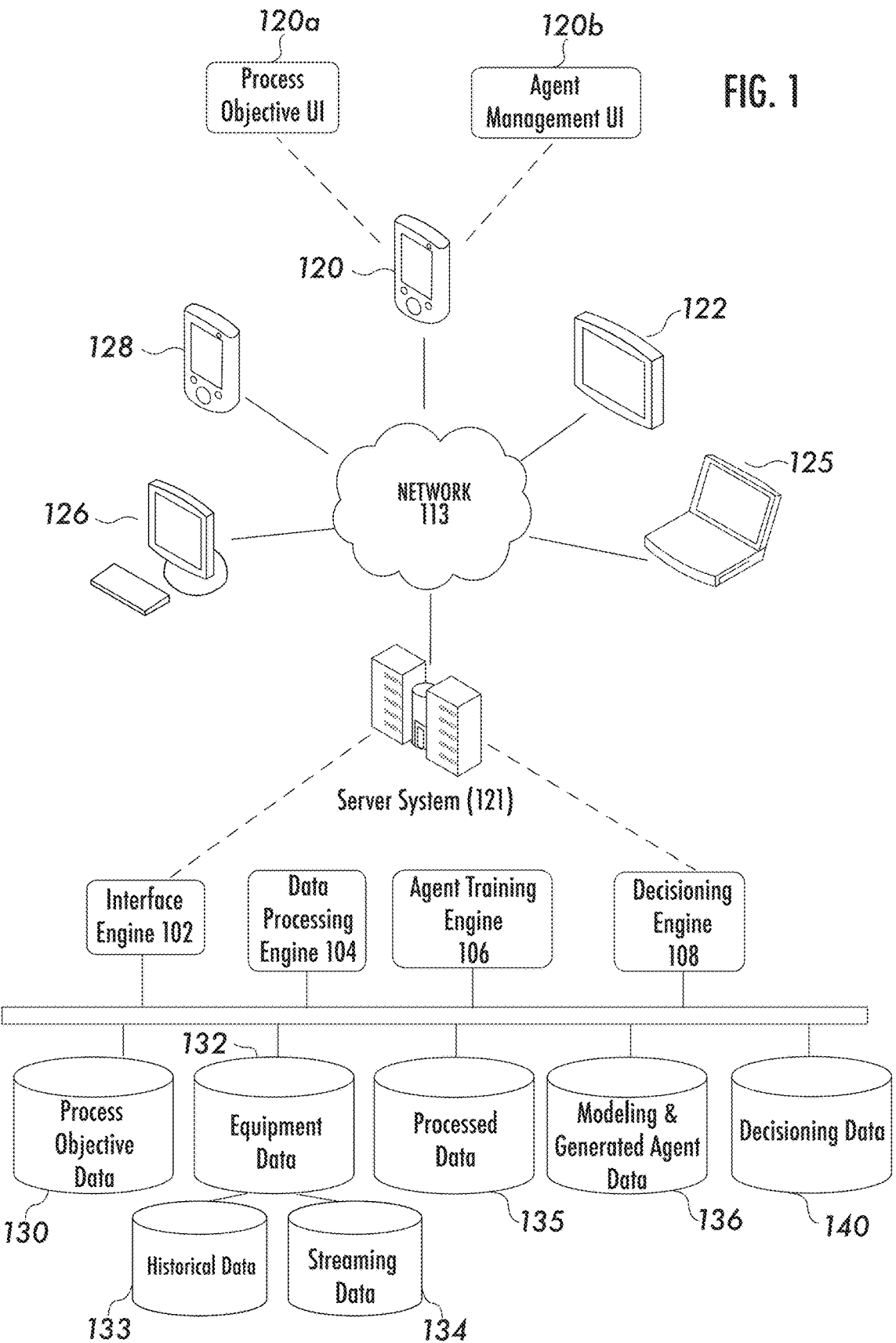
FIG. 1 is a schematic diagram of an example optimization system used in certain implementations.

FIG. 1 illustrates an example optimization system 100. The system 100 is capable of analyzing significant amounts of objective data (e.g., defined by an end user) and process data (e.g., derived from one or more equipment) to produce various outputs useful to determining an optimization of one or more KPIs. The system 100 can comprise hardware components, software components and databases that can be deployed at one or more data centers in one or more geographic locations, for example. In some instances, certain components are hosted on third-party servers (e.g., Amazon Web Services). One or more client devices (e.g., client devices 120, 122, 125, 126 and 128) such as laptop computers, smart phones, tablet computers or desktop computers make requests and receive responses from a server system 121 through network 113. The network 113 can be one or more public or private data communication networks such as the Internet, for example. The communication protocol used by the client devices to communicate with the server system 121 can be HTTP (Hypertext Transfer Protocol) or any other suitable protocol.

In some implementations, each client device contains one or more software components such as a process objective user interface ("UI") 120a and an agent management UI 120b. These components can be implemented as web pages or as stand-alone applications that execute atop operating system software on the client devices. In some cases, the process objective UI 120a and the agent management UI 120b may be combined. In some cases, the process objective UI 120a and the agent management UI 120b may be included as a part of an application programming interface ("API"). In various implementations, client device UIs may be engaged by employees (e.g., domain level experts) of entities that operate industrial processes. The process objective UI 120a may be configured for the generation and tuning of AI agents that are configured to optimize one or more KPIs (e.g., by generating recommended actionable processes for the industrial process). For example, the process objective UI 120a can receive inputs and display outputs of the interface engine 102, which can be useful for defining objective information (e.g., objective functions, process variables, constraints, features, etc.) for an industrial process. The agent management UI 120b may be configured for the management and evaluation of AI agents. For example, the agent management UI 120b can display outputs of the agent training engine 106 and decisioning engine 108, which can be useful for visualizing and evaluating an ability of an agent to optimize an industrial process. In some implementations, the agent management UI 120b may be used for enterprise management of the optimization system 100 as to be described herein. In an example, users may interact with the agent management UI 120b to create and manage an account associated with the optimization system 100 and identify other users of the optimization system 100, such that generated AI agents may be shared between users for further evaluation.

In various implementations, the server system 121 components can include the interface engine 102, the data processing engine 104, the agent training engine 106, and/or the decisioning engine 108. In various instances, some or all of the engines have the capability to run a large number of derived variables at high processing speeds (e.g., 1 billion rows/hour, 2 billion rows/hour, 3 billion rows/hour, 5 billion rows/hour, 10 billion rows/hour, etc.) The software components can comprise subcomponents that can execute on the same or on different individual data processing apparatus. The software components can also use data drawn from a variety of sources. As one non-limiting example, the server system 121 can include and/or have access to the following databases: a process objective data database 130, an equipment data database 132, a feature data database 135, a modeling and generated agent data database 136, and a decisioning data database 140, each of which are described in more detail below. The databases can reside in one or more physical storage systems and can be implemented as relational databases, flat files, object-oriented databases, or combinations of these.

In various implementations, the interface engine 102 may be an interactive engine that interfaces with the process objective UI 120a and the agent management UI 120b. In some implementations, a user may interact with the server system 121 via the interface engine 102, such that the interface engine 102 serves as a proxy between the software components operating at client devices and the other engines (104, 106, 108) of the server system 121. To configure the optimization system 100, a user may import equipment data and/or grant the server system 121 access to equipment data associated with an industrial process, such that the equipment data is stored by an equipment data database 132. In an example, data in the equipment data database 132 may be stored in a textual data format (e.g., JavaScript Object Notation (JSON)). A user may import equipment data and/or grant the server system 121 access to equipment data by interacting with the interface engine 102 via the process objective UI 120a and/or the agent management UI 120b.

In various implementations, the equipment data database 132 may include a historical data database 133 and a streaming data database 134. The equipment data database 132 may store and/or or access metadata associated with the one or more equipment used in an industrial process. The metadata may include one or more of equipment identifiers, equipment parameters, equipment types, sensor identifiers (e.g., sensor tag naming conventions), sensor parameters (e.g., latency, measurement frequency, etc.), sensor types, control identifiers, control parameters, a supervisory control system (e.g. SCADA, DCS, or BMS) and its associated communication protocol, and configuration data for interfacing with the equipment and/or the sensor data streams. The metadata may be received from users (e.g., via the interface engine 102), the equipment, and/or made available to the equipment data database 132 via one or more configuration files. In some cases, the metadata may be used to augment and/or supplement system characteristic information supplied by a user as to be described herein. The historical data database 133 may include historical data corresponding to an industrial process (and associated equipment). In an example, the historical data may include historical sensor data and/or control data from equipment used in an industrial process aggregated over an interval of time. Examples of sensors that may measure and/or otherwise provide sensor data may include temperature sensors, pressure sensors, rotational object (e.g., fan) sensors, pump sensors, on/off sensors, energy (e.g., electrical power) sensors, etc. The data stored by the historical data database 133 may be uploaded by a user (e.g., as a data file), made accessible to the optimization system 100 via an API, or received from equipment communicatively coupled to the optimization system 100. In some cases, the streaming data database 134 may store sensor data and/or control data derived from equipment used in an industrial process. The optimization system 100 may be communicatively coupled to one or more equipment using in the industrial process, such that sensor data and control data may be received at the streaming data database 134 in real-time or approximately real time (e.g., every second, every 10 seconds, every minute, etc.). Examples of control data may include process setpoint values (e.g., configured temperature setpoints, configured pressure setpoints, configured rotation setpoints, etc.).

Embodiments of an Interactive Interface Engine

In various implementations, the interface engine 102 may serve to extract objective information (e.g., a problem statement) for the industrial process from users (e.g., domain level experts). The process objective UI 120a may serve as a gateway for a user to input the objective information to the optimization system 100. The interface engine 102 may be configured to aggregate objective information associated with an industrial process using one or more queries directed toward users of the optimization system 100. In an example, system level knowledge of the industrial process may be held by the domain experts that engage with the industrial process. Accordingly, the queries generated by the interface engine 102 may be directed towards the domain experts.

In some implementations, to aggregate objective information, the interface engine 102 may execute one or more operations to determine at least one KPI for an industrial process, where a KPI may be a measurable characteristic associated with an industrial process. In an example, a KPI may be indicative of a measurement, an output, and/or a product of the industrial process. The interface engine 102 may receive at least one KPI for the industrial process via the process objective UI 120a (e.g., by a user input). In an example, KPIs for an industrial process may include energy usage or yield. The interface engine 102 may generate one or more queries for display at the process objective UI 120a, such that the interface engine 102 may receive information from a user (e.g., a domain level expert) and/or another individual regarding the industrial process and/or the KPI(s). Based on receiving a response to the one or more queries, the interface engine 102 may generate one or more additional queries to receive additional information regarding the industrial process and/or the KPI(s). Objective information associated with generation or tuning of an AI agent that is received and/or determined by the interface engine 102 may be stored at the process objective data database 130. Equipment data associated with the equipment used in the industrial process may be stored at the equipment data database 132 as described herein.

In some implementations, the interface engine 102 may receive system characteristic information for the industrial process and/or KPI(s) in response to the one or more queries. The system characteristic information may include a configuration of the equipment that enable the industrial process. The system characteristic information may include a configuration of one or more sensors and/or measurement devices associated with the equipment. The received system characteristic information may be stored in the equipment data database 132. In some cases, the received system characteristic information may be used to augment the data stored by the historical data database 133 and/or the streaming data database 134, such that the interface engine 102 may supplement the existing equipment data to further comprehend the industrial process.

In some implementations, the interface engine 102 may receive process information associated with the industrial process in response to the one or more queries. The process information may be associated with and/or indicative of the KPI(s). In some cases, the process information may include one or more objective functions that measure the KPI(s), one or more process variables included in the one or more objective functions, and one or more constraints for the one or more process variables. A process variable may be associated with an action that can be executed to modify an output (e.g., the KPI) of an objective function and/or the industrial process. A constraint for a process variable may be a range and/or a threshold associated with the process variable, such that the process variable is limited by the constraint. In some cases, a process variable may have one or more constraints. In some cases, a constraint may be violated for a duration of time. The process information may include an indication that a constraint may be violated. In an example, a constraint may be violated for a defined period of time or for a defined magnitude beyond a configured range or threshold.

In some implementations, the interface engine 102 may generate one or more queries to enable users to express the objective function(s) that measure the KPI(s). In some cases, the interface engine 102 may generate a query prompting a user to define a name for an objective function. In an example, the query may prompt a user to define a human-readable name for an objective function. In some cases, the interface engine 102 may generate a query prompting a user to indicate how an objective function is measured. An objective function may be measured, for example, (1) directly by sensors or equipment used in an industrial process and (2) indirectly as a combination of measurements from sensors or equipment used in an industrial process. If an objective function is directly measured, the interface engine 102 may generate a query prompting a user to indicate the sensor(s) and/or equipment that directly measure the objective function. If an objective function is indirectly measured, the interface engine 102 may generate a query prompting a user to define an expression for the elements that are included in the objective function. The interface engine 102 may further generate a query prompting a user to indicate the sensor(s) and/or equipment that are mapped to each of the elements included in the objective function. In an example, an objective function that is indirectly measured may be expressed as: "Chiller Plant Energy Usage"="Chiller Energy"+"Pump Energy"+"Cooling Tower Energy", where the elements "Chiller Energy", "Pump Energy", and "Cooling Tower Energy" are each mapped to sensor and/or equipment measurements (e.g., as streaming data stored by the streaming data database 134). Based on a user providing an indication of a mapping of an objective function or elements of an objective function to data stream(s) associated with sensors or equipment, the interface engine 102 may store the mapping(s) in the process objective action data database 130 and/or the equipment data database 132 (e.g., for access by the data processing engine 104).

In some implementations, the interface engine 102 may generate one or more queries to enable users to express the process variable(s) (i.e. actions) associated with each objective function. For each objective function, the interface engine 102 may generate one or more queries prompting a user to identify process variables that can modify the output of the objective function. In some cases, the interface engine 102 may generate one or more queries prompting a user to define a name for each process variable. In an example, a query may prompt a user to define a human-readable name for a process variable. In some cases, the interface engine 102 may generate one or more queries prompting a user to identify a dependence of a process variable. A process variable may be configured, for example, (1) independent of one or more other process variables or (2) dependent on (i.e. linked to) one or more other process variables. An independent process variable may be modified independent of one or more other process variables and a dependent process variable may not be modified independent of one or more other process variables. As an example, a dependent process variable may be activating or deactivating a chiller, which also requires a separate pump to be activated or deactivated in accordance with the chiller. The interface engine 102 may enable a user to link one or more associated dependent variables, where a first dependent variable and a second dependent variable are associated if modifying the first/second dependent variable requires modification of the second/first dependent variable.

In some cases, the interface engine 102 may generate one or more queries prompting a user to identify a configuration of a process variable. A process variable may be configured, for example, (1) directly or (2) indirectly. A process variable may be directly configured if a user may directly configure the process variable by providing an input to control(s) of the equipment used in the industrial process. A process variable may be indirectly configured if the process variable is configured automatically by the equipment (e.g., by automated control mechanisms or techniques) used in the industrial process (e.g., based on constraints). In some cases, if a process variable is indirectly configured, the interface engine 102 may generate a query prompting a user to indicate whether the process variable may be overridden (e.g., via a user input). If the interface engine 102 receives an indication that the process variable may be overridden, the interface engine 102 may determine the process variable to be directly configured (rather than indirectly configured). If the interface engine 102 receives an indication that the process variable may not be overridden, the interface engine 102 may generate a prompt suggesting that a user remove the process variable, as an indirectly configured process variable may not be optimized by the optimization system 100.

In some cases, for each process variable, the interface engine 102 may generate one or more queries prompting a user to identify sensors and/or equipment that are indicative of the process variable. For example, for a process variable defined by chiller temperature, a user may map the process variable to a plurality of temperature sensors that measure the chiller temperature. In some cases, the interface engine 102 may generate one or more queries prompting a user to indicate constraints (e.g., ranges or thresholds) associated with each process variable. For example, based on receiving an input indicating a process variable defined by chiller temperature, the interface engine 102 may generate a query prompting a user to indicate a minimum and/or maximum temperature for the process variable. Constraints may include one or more characteristics as described below.

In some cases, based on received process variable information, the interface engine 102 may determine one or more effective process variables, where the changes in the effective process variable(s) may cause the greatest change to the corresponding objective function(s). In some cases, to determine the one or more effective process variables for an objective function using one or more action selection process heuristics. As an example, to determine the effective process variables for an objective function, the interface engine 102 may execute a dimensionality reduction based on the objective function, process variable(s), dependence of the process variable(s), and/or configuration of the process variable(s). Example dimensionality reduction techniques may include principle component analysis (PCA) and t-distributed stochastic neighbor embedding (t-SNE). Based on determining the effective process variable(s), the interface engine 102 may cause display of the effective process variables at the process objective UI 120a for selection by a user. A user may accept or decline the recommended effective process variable(s) at the process objective UI 120a. By accepting or declining recommended process variable(s), user may configure the processes of the industrial process that may be controlled by the optimization system 100.

In some implementations, the interface engine 102 may generate one or more queries to enable users to express the constraints associated with each objective function (and corresponding process variable(s)). For each objective function, the interface engine 102 may generate one or more queries prompting a user to identify constraints that can limit the objective function and/or the process variable(s) included in the objective function. In some cases, the interface engine 102 may generate one or more queries prompting a user to define a name for each constraint. In an example, a query may prompt a user to define a human-readable name for a constraint. In some cases, for each constraint, the interface engine 102 may generate one or more queries prompting a user to identify a locality of the constraint. A locality of a constraint may be configured, for example, as (1) localized to a specific equipment within the industrial process or (2) global to the broader industrial process. An example of a local constraint may be that a pump speed may be constraint to operate between 50% and 100% of its configurable speed. An example of a global constraint may be that a temperature for a fluid used in a process is constrained to between 45-50° F., where different equipment used in the process may contribute to changing the temperature of the fluid. In some cases, for each constraint, the interface engine 102 may generate one or more queries prompting a user to identify whether the constant is associated with more than one process variable. Based on a response from a user indicating a constraint is associated with more than one process variable, the interface engine 102 may identify relationships between process variables with linked constraints.

In some implementations, the interface engine 102 may generate one or more queries prompting a user to identify a state of a constraint. A state of a constraint may be identified, for example, as (1) static or (2) dynamic, where a static constraint is fixed and a dynamic constraint varies based on a state of an industrial process. A state of the industrial process may be a function of sensor data and/or control data stored by the streaming data database 134. If the interface engine 102 receives an indication that a constraint is static, the interface engine 102 may generate a query prompting a user to provide a value for the constraint. In some cases, a user may input a value for the constraint. In other cases, a user may map the constraint to a value and/or sensor data indicated by equipment used in the industrial process. If the interface engine 102 receives an indication that a constraint is dynamic, the interface engine 102 may generate a query prompting a user to provide an expression defining element(s) of the constraint. In an example, the expression may be a human-readable expression such as "Maximum flow rate"="Number of activated chillers"×3600 gallons per minute. In some cases, the interface engine 102 may prompt a user to map the element(s) (e.g., "Number of activated chillers") of the constraint to sensor data indicated by equipment used in the industrial process.

In some implementations, for each constraint, the interface engine 102 may generate one or more queries prompting a user to identify whether a constraint is verified via a measurement or calculation in the industrial process. If the interface engine 102 receives an indication that a constraint is verified via a measurement, the interface engine 102 may generate one or more queries prompting a user to map the verification measurement to sensor data indicated by equipment used in the industrial process. If the interface engine 102 receives an indication that a constraint is verified via a calculation (e.g., within an expression), the interface engine 102 may generate one or more queries prompting a user to provide an expression defining verification of element(s) of the constraint. In an example, the expression may be a human-readable expression such as "Minimum Differential Pressure"=MIN("Differential Pressure Sensor 1", "Differential Pressure Sensor 2", "Differential Pressure Sensor 3"), such that the differential pressure measurements from first, second, and third sensors may be determined to verify whether a "Minimum Differential Pressure" constraint is satisfied.

In some implementations, for each constraint, the interface engine 102 may generate one or more queries prompting a user to identify a violation property of a constraint. A violation property of a constraint may indicate, for example, a constraint as a hard constraint or a soft constraint. A hard constraint may not be violated for any period of time. A soft constraint may be violated for a period of time. In some cases, a soft constraint may be violated for a period of time within a fixed range beyond a value of the constraint. If the interface engine 102 receives an indication that a constraint is a soft constraint, the interface engine 102 may generate one or more queries prompting a user to identify a period of time for which the constraint may be violated and/or a fixed range within which the constraint may be violated.

Industrial processes that are overly constrained may be limited for optimization of their associated KPI(s) by the optimization system 100. Accordingly, based on received constraint information, the interface engine 102 may suggest one or more constraint modifications (e.g., relaxations) to a user via the process objective UI 120a. Such suggested constraint modifications may be available via the interface engine 102 after training and generation of agents (and corresponding models if applicable) is initially completed as to be described herein. The suggested constraint modification(s) may be accepted or declined by a user via the process objective UI 120a. If the interface engine 102 receives an indication accepting a suggested constraint modification, the suggested constraint modification may be implemented for the associated constraint. In some cases, a suggested constraint modification may be presented with an indication of a proposed performance improvement, where the proposed performance improvement is based on an acceptance of the suggested constraint modification.

In some implementations, the interface engine 102 may generate one or more queries prompting a user to identify one or more features of the industrial process that may be used by the optimization system 100 to optimize the industrial process and/or the defined KPI(s). The one or more features may include any and/or all data input to the optimization system 100. The one or more features may include process variables and constraints as described herein, as well as other data/information input to the optimization system 100 that may not be directly controlled by a user (e.g., via the interface engine 102) or the optimization system 100. In some cases, the one or more queries may prompt the user to identify feature(s) of the industrial process that the user believes to be useful for optimizing the industrial process and/or KPI(s). A user may select the feature(s) at the process objective UI 120a. In some cases, the process objective UI 120a may display sensor data and/or control data from the equipment used in the industrial process that corresponds to the feature(s). In an example, features and corresponding sensor data and/or control data may be displayed via a selectable checklist, a drag-and-drop interface, a dropdown menu, a searchable library, a tree-like hierarchy, or any other suitable selection mechanism. In some cases, the interface engine 102 may generate one or more recommendations of sensor data for inclusion as features used in a generated AI agent. The interface engine 102 may generate the recommendation(s) based on commonly used data associated with the industrial process and/or the KPI(s). In an example, for a received KPI of chiller plant energy usage, the interface engine 102 may generate and display recommendations (e.g., at the process objective UI 120a) to use data from pressure sensors, flow meters, and temperature sensors of the industrial system as features to optimize the KPI.

In some implementations, the interface engine 102 may enable a user to filter sensor data and/or control data at the process objective UI 120a. The interface engine 102 may enable data filtering by a sensor type and/or by an equipment identifier. In an example, a user may filter sensor data based on a "temperature" sensor type and a "furnace" equipment type. In some cases, the interface engine 102 may generate a visualization of the historical data and streaming data, which may be displayed at the process objective UI 120a. The visualization may include a data hierarchy (e.g., based on a user-provided semantic data model), including one or more nodes. An example ontology for the hierarchy where each element includes the following element may be as follows: site (e.g., a single building or location of equipment/sensors), space (e.g., a floor, room, HVAC zone, lighting zone, etc.), equipment (e.g., a physical asset such as a meter, air handler, boiler, etc.), point (e.g., a sensor, setpoint, or actuator), and device (e.g., processor based hardware such as controllers, networking gear, etc.) As an example, an industrial process may involve one or more spaces (e.g., rooms), each room including one or more equipment, and each equipment including one or more sensors with corresponding sensor data. Accordingly, the visualization may shows historical and streaming data in the context of the hierarchy corresponding to the relevant data. A user may identify nodes included in the data hierarchy and input sensor data to the hierarchy. In an example, the sensor data may be available via a drag-and-drop interface at the process objective user interface 120a, such that a user may drag-and-drop sensor data into the data hierarchy to supplement and/or modify the generated visualization.

Based on receiving a selection of a feature, the interface engine 102 may generate one or more queries prompting a user to label the feature. In some cases, the query(ies) may prompt the user to label the feature with a unit designation (e.g., ° Celsius, Watts, m/s, pounds per square inch (PSI), etc.). In some cases, the interface engine 102 may automatically label a selected feature. Based on automatically labeling a selected feature, the interface engine 102 may generate a query prompting a user to accept or decline the automatic labeling of the selected feature.

In some implementations, the interface engine 102 may filter the feature(s) identified by a user, such that feature(s) that are unsuitable to the optimization of the industrial process and/or KPI(s) are excluded and/or removed from consideration by the optimization system 100. In some cases, the interface engine 102 may execute an audit of sensor data and/or control data associated with each identified feature. The interface engine 102 may identify a selected feature as unsuitable based on determining the sensor data and/or control data corresponding to the selected feature to be unsatisfactory. In an example, sensor data and control data may be unsatisfactory if they are missing data points, have too high a latency between data points, repeat data points, have invalid data points, etc. Any suitable technique may be used to identity features (and corresponding data) as unsuitable or suitable for ML training processes. As an example, the interface engine 102 may execute a dimensionality reduction based on the objective function and selected features (and associated historical data and/or streaming data). The dimensionality reduction may determine the selected feature(s) that significantly impact the objective function. Based on the executed audit and dimensionality reduction, the interface engine 102 may suggest selected feature(s) for removal from consideration by the optimization system 100. The interface engine 102 may generate a query prompting a user to accept or reject the suggestion. If the interface engine 102 receives an indication that a suggestion is accepted, the interface engine 102 may remove the suggested feature from consideration for optimizing the industrial process and/or KPI(s). If the interface engine 102 receives an indication that a suggestion is declined, the interface engine 102 may include the suggested feature for consideration in optimizing the industrial process and/or KPI(s).

In some implementations, the interface engine 102 may evaluate an ability of the optimization system 100 to optimize the KPI(s). The interface engine 102 may evaluate the ability to optimize the KPI(s) based on the received objective functions, process variables, constraints, and generated features that define the KPI(s) to be optimized by the optimization system. In some cases, the interface engine 102 may display an indication of the ability of the optimization system 100 to optimize the KPI(s) by a readiness indicator at a UI component. For example, the interface engine 102 may cause display of a readiness indicator at the process objective UI 120a. The readiness indicator may be updated based on receiving objective information from a user at the process objective UI 120a. For example, based on receiving a constraint for a process variable, the readiness indicator may indicate an improved ability of the optimization system to optimize the KPI(s) associated with the constraint. In some cases, the readiness indicator may include a state indicator selected from one or more state indicators (e.g., poor, good, excellent) to indicate an ability of the optimization system to optimize the KPI(s).

In various implementations, the optimization system 100 may require data processing capabilities to generate data sets (e.g., including one or more features) for training AI agents and enabling the trained AI agents to execute decisioning processes for an industrial process. Data requiring data processing may include the objective information, the metadata associated with the one or more equipment used in an industrial process, the historical data derived from equipment used in an industrial process aggregated over an interval of time, and the streaming data derived from equipment used in an industrial process in real-time or approximately real-time. The data processing engine 104 may be configured to process the data as described herein for use by the modeling module 106 and/or the decisioning module 108.

Embodiments of a Data Processing Module

Figure 2:
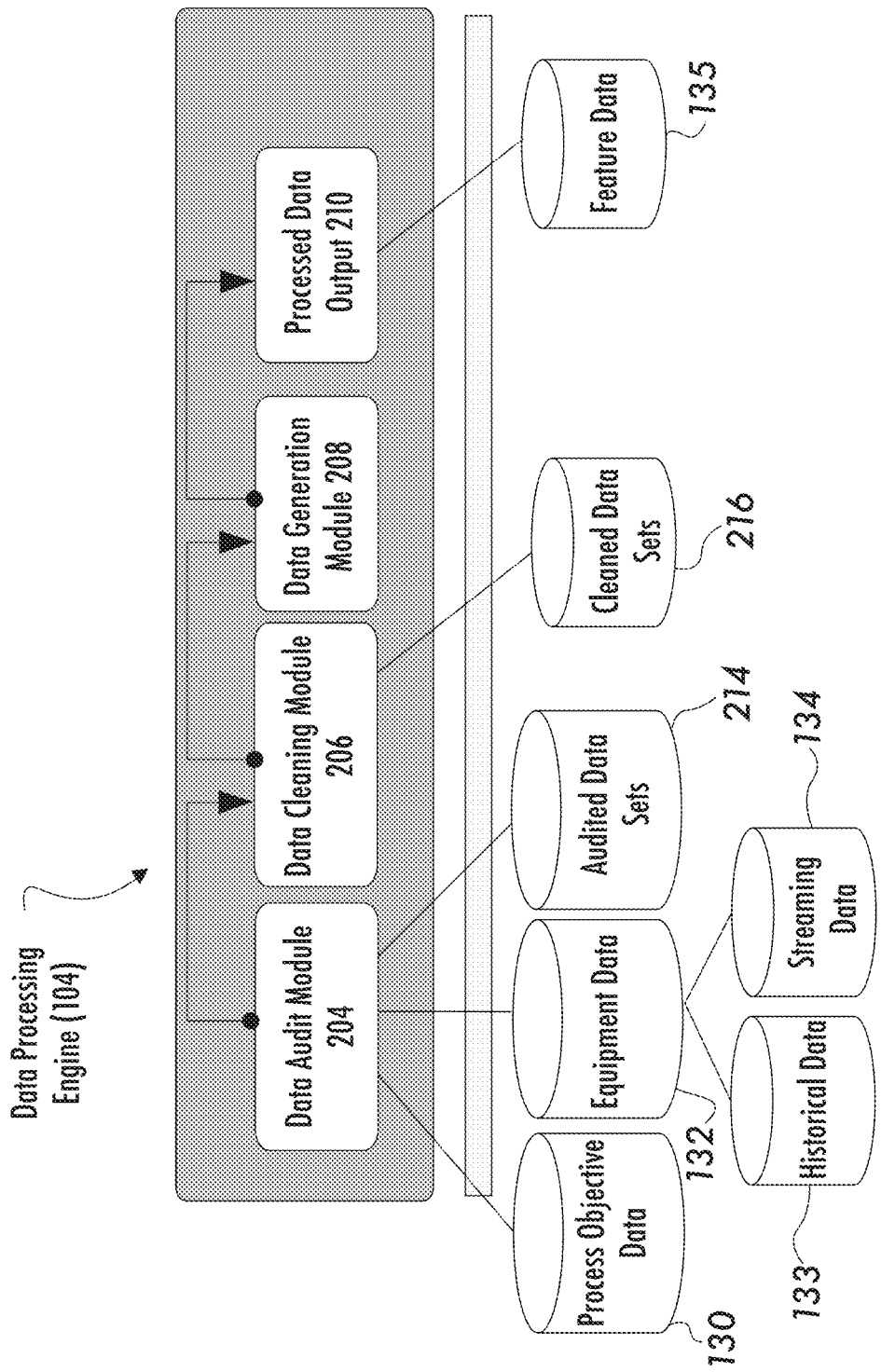
FIG. 2 is a schematic diagram of an example data processing engine for processing historical data and streaming data to optimize an industrial process.

FIG. 2 shows a schematic diagram of an example data processing engine 104 for processing historical data and streaming data to optimize an industrial process. The data processing engine 104 may have access to the process objective data database 130, the equipment data database 132, and the feature data database 135. The data processing engine 104 may include one or more elements. Elements of the data processing engine 104 may include a data audit module 204, a data cleaning module 206, a data generation module 208. Outputs of the data processing engine 104 may include one or more processed data sets 210, which may be stored in the feature data database 135. The processed data sets 210 may be provided to the agent training engine 106 as to be described herein. The data processing engine 104 may process received data into the processed data sets 210 based on one or more data version configurations. The data version configuration may include and/or otherwise define the data processing rules that convert raw data (e.g., from the process object data store 130 and/or equipment data stores 132) to the one or more processed data sets 210 as described further below.

In some implementations, the data processing engine 104 may include the data audit module 204. The data audit module 204 may receive data inputs from the process objective data database 130 and the equipment data database 132, where the equipment database 132 includes and/or has access to the historical data database 133 and the streaming data database 134. The data audit module 204 may audit the received data using one or more rules and/or heuristics to identify data having one or more characteristics as described below. The data audit module 204 may audit the received data to identify data with one or more of: missing data points, repeating data points, invalid data points, high latency for the data to reach the optimization system 100 (e.g., in the equipment data database 132) repeating data, and data with sensor drift (e.g., data with long time periods between sensor measurements). Based on identifying data having one or more of the characteristics as described above, the data audit module 204 may flag the identified data (e.g., generate an indication that the identified data includes one or more of the above characteristics). Based on auditing the received data, The data audit module 204 may output one or more audited data sets, which may be input to the data cleaning module 206 and stored in a database 214.

In some implementations, the data cleaning module 206 may receive one or more audited data sets from the data audit module 204. The data cleaning module 206 may receive one or more system characteristic information and/or objective information from the process objective data database 130, including objective function(s), process variable(s), constraint(s), feature(s), and associated metadata as described herein. Based on a data version configuration of one or more data version configurations, the data cleaning module 206 may clean the one or more audited data sets to generate one or more cleaned data sets. A particular data version configuration may include one or more rules and heuristics used to clean audited data sets, where each of the data version configurations may have varying rules and heuristics. The rules and heuristics of a particular data version configuration may be pre-configured or configured by a user (e.g., via the process objective UI 120a or agent management UI 120b). The data cleaning module 206 may remove and/or otherwise clean one or more of the flagged data included in the one or more audited data sets. In an example, the data cleaning module 206 may remove sensor data values from the audited data sets based on the sensor data values missing data values, having null data values, and/or having too high of a latency between collected data values. In some cases, the data cleaning module 206 may clean the one or more audited data sets using one or more iterative data imputation methods. Examples of data imputation methods to clean the audited data sets may include interpolation, mean value, and last known value data insertion techniques. In some cases, the data cleaning module 206 may clean the one or more audited data sets using the received system characteristic and/or objective information. In some cases, data and/or techniques derived from prior data cleaning operations may be used by the data cleaning module 206 to clean the one or more audited data sets. Data cleaning operations performed by the data cleaning module 206 may be performed automatically based on receiving the one or more audited data sets. Based on the one or more available data version configurations, the data cleaning module 206 may generate one or more versions of cleaned data sets, where each version corresponds to a different data version configuration. For example for a pair of audited data sets and three different data version configurations, the data cleaning module 206 may generate six cleaned data sets, where each of the data version configurations were used to clean each audited data set. The data cleaning module 206 may output the one or more cleaned data sets, which may be provided as an input to the data generation module 206 and stored in a database 216.

In some implementations, the data generation module 208 may receive one or more cleaned data sets from the data cleaning module 206. Based on a data version configuration of one or more data version configurations, the data generation module 208 may generate one or more processed data set outputs 210 using the one or more cleaned data sets. In some cases, the data generation module 208 may generate one or more versions of a particular processed data set, where each version may corresponding to a different data version configuration. The processed data set outputs may be stored in the feature data database 135. In some cases, the data generation module 208 may include one or more data version configurations, where each data version configuration may include varied instructions, such that the processed data sets of one or more configurations may be input to the agent training engine 106. In an example, the agent training engine 106 may train and generate agents of one or more configurations based on the one or more versions of the processed data sets generated by the data generation module 208.

In some implementations, the processed data set(s) may include data directed to one or more features indicative of the KPI(s) that are to be optimized. In some cases, the feature(s) may be defined and/or otherwise derived from the objective information. For example, features may be mapped to process variables included in the objective function(s) provided by a user. A data version configuration may include instructions for generating the features and/or targets of agents (e.g., agents 310) generated by the optimization system 100. A data version configuration may include instructions (e.g., rules and heuristics) for defining one or more targets for process variables and/or constraints.

Embodiments of an Agent Training Engine

Figure 3:
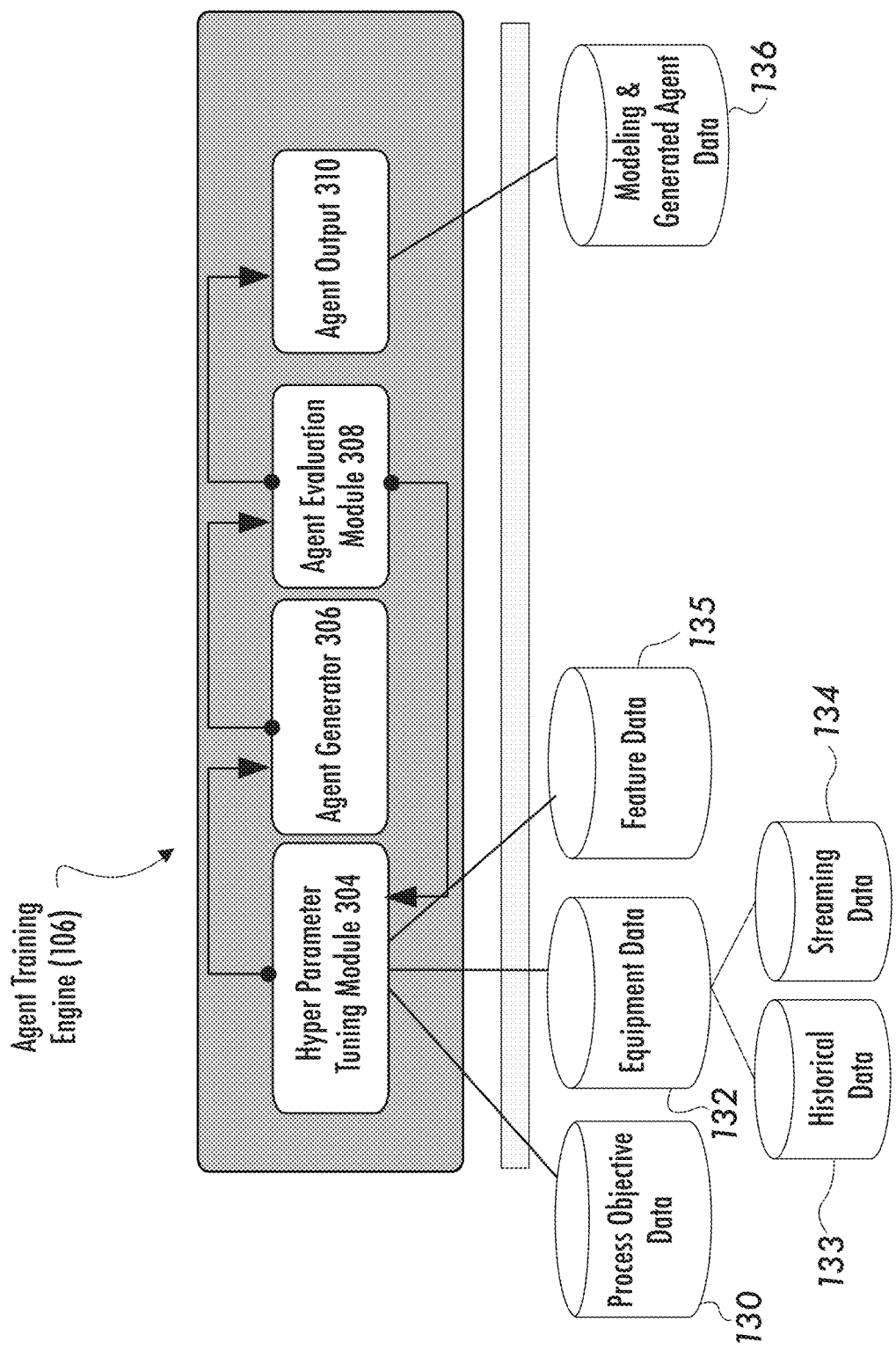
FIG. 3 is a schematic diagram of an example agent training engine for training and generating artificial intelligence (AI) agents to optimize an industrial process.

FIG. 3 shows a schematic diagram of an example agent training engine 106 for training and generating AI agents to optimize an industrial process. The agent training engine 106 may have access to the process objective data database 130, the equipment data database 132, the feature data database 135, and the modeling and generated agent data database 136. The agent training engine 106 may include one or more elements. Elements of the agent training engine 106 may include a hyper parameter tuning module 304, an agent generator 306, an agent evaluation module 308. Outputs of the agent training engine 106 may include one or more AI (e.g., reinforcement learning) agents 310 configured to optimize an industrial process as described herein, which may be stored in the modeling and generated agent data database 136. The agent(s) 310 may be provided to the decisioning module 108 as to be described herein.

In some implementations, the agent training engine 106 may include the hyper parameter tuning module 304. The hyper parameter tuning module 304 may receive data inputs from the process objective data database 130, the equipment data database 132, and the feature data database 135. In some cases, the hyper parameter tuning module 304 may optimize the values of the hyper parameter(s) used by models generated via the agent training engine 106, such that the predictive accuracy of a generated model (and resulting AI agent) may be maximized to optimize the KPI(s) of an industrial process. Some non-limiting examples of hyper parameters may include network topology, number of hidden layers, learning rate, and mini-batch size. In some cases, hyper parameters may be a function of a type of AI architecture used in AI models and agents. For example, hyper parameters may be a function of type of neural network architecture used in an AI model. To optimize the values of the hyper parameter(s), the hyper parameter tuning module 304 may select initial (and subsequently tuned) values for each of the hyper parameters. Initial values for each of the hyperparameters may be randomly initialized and/or selected from a previously trained model. The initial values for each of the hyper parameters may be input to the agent generator 306.

In some implementations, the agent training engine 106 may include an agent generator 306. The agent generator 306 may receive the processed data sets 210 and the initial (and subsequent) hyper parameters from the hyper parameter tuning module 304. In some cases, the agent generator 306 may include one or more model configurations, where each model configuration defines a model type and/or configuration. As an example, a model configuration may include parameters and/or instructions for instantiating a particular AI model. Example model types may include neural networks (e.g., recurrent neural networks), decision tree algorithms, genetic programming algorithms, residual networks, etc. In some cases, the agent generator 306 may generate each model specified by the agent configuration(s). Each model generated by the agent generator 306 may be trained by the agent evaluation module 308 to generate predictions for KPI(s) based on the received objective information. In some cases, predictions for KPI(s) that are generated by the models may be used by agents to generate actions that optimize KPI(s).

In some cases, the agent generator 306 may include one or more agent configurations, where each agent configuration includes instructions for instantiating a type of reinforcement learning agent (i.e. "agent"). The agent generator 306 may generate one or more types of reinforcement learning agents. Types of reinforcement learning agents generated by the agent generator 306 may include (1) a value-based learning agent, (2) a policy-based learning agent, and/or (3) actor-critic learning agent. Each agent generated by the agent generator 306 may be trained by the agent evaluation module 308 to generate actions corresponding to optimization of KPI(s). In some cases, agents may use models generated by the agent generator 306 to determine actions (e.g., actions to be performed on an industrial process) corresponding to optimizing KPI(s). A value-based learning agent may include a trained model and a search algorithm (e.g., a Monte Carlo Tree Search). In other cases, agents may not use models generated by the agent generator 306. A policy-based learning agent may estimate an end state of the system (e.g., system corresponding to an industrial process) directly as a function of the actions performed on and/or at the system. An actor-critic learning agent may operate based on a combination of the functionalities of a value-based learning agent and a policy-based learning agent.

In some implementations, based on the received information, generated model(s), and/or generated agent(s), the agent generator 306 may train the model(s) and/or agent(s) according to the processed data set(s) 210 and the selected hyper parameter(s). As an example, the agent generator may train agents and corresponding models based on the features included in the processed data set(s) 210 and the selected hyper parameters. In some cases, the agent generator 306 may train models and agents simultaneously (e.g., together). As an example, for a value based learning agent, the agent generator 306 may train the value-based learning agent and its corresponding model simultaneously. In some cases the agent generator 306 may train models and agents separately. As an example, for a policy-based learning agent, the agent generator 306 may train the policy-based learning agent separately from one or more models (e.g., based on the policy-based learning agent lacking use of a generated model). A model and/or an agent may be trained by executing one or more trials. One or more trials may be included as a part of a training job. Each trial may be an execution of a training application using initial (or tuned) values for each of the hyper parameters. A result of each trial may be input to the hyper parameter tuning module 304. As an example, a result corresponding to training a model may be a prediction for a particular KPI and a result corresponding to training an agent may be an action to control a particular KPI. In some cases, the hyper parameter tuning module 304 may analyze the result of each trial and iteratively tune the values of the hyper parameter(s) based on the analysis. The tuned hyper parameter(s) may be input to the agent generator 306, such that the agent generator 306 may continue to train the generated models (e.g., according to training jobs as described above). Based on training one or more agents, the agent generator 306 may input and/or otherwise provide the trained agent(s) to the agent evaluation engine 308. In some cases, trained agent(s) and associated model(s) (if applicable) may be made available to a user (e.g., via the process objective UI 120a or the agent management UI 120b). In an example, a user may download a trained agent and associated model to a local and/or edge computing device. In some cases, a trained agent made available to a user may be quantized (e.g., scaled down), such that the trained agent may be operable on a computing system accessible to a user (e.g., a local and/or edge computing device).

In some implementations, the agent training engine 106 may include an agent evaluation module 308. The agent evaluation module 308 may receive the trained agents (and models if applicable) from the agent generator 306. In some cases, the agent evaluation module 308 may receive objective information included in the processed data sets 210, such that the agent evaluation module 308 may evaluate the trained model(s) based on the objective functions, process variables, and constraints provided by a user. In some cases, the agent evaluation module 308 may receive system characteristic information, such that the agent evaluation module 308 may use contextual information from the industrial process to evaluate the trained model(s). In some cases, the agent evaluation model 308 may evaluate the trained agent(s) using off-policy evaluation (OPE), where evaluation of trained agent(s) may be executed using offline metrics of the industrial process. Examples of OPE evaluation techniques may include importance sampling techniques, model-based techniques, and a combination of importance sampling and model-based techniques. Based on the OPE, the agent evaluation module 308 may determine one or more prediction accuracies for the trained model(s). In some cases, the agent evaluation module 308 may generate an OPE score for each trained agent, such that each of the trained models may be compared and/or ranked based on their respective OPE score. An OPE score may be indicative of an ability of a trained agent to satisfy the constraints of a KPI and generate actions that optimize the KPI output. In some cases, via the process objective UI 120a, a user may specify a testing suite of checks for a trained agent. Based on applying the testing suite to a trained agent, the agent evaluation module 308 may score the trained agent. In some cases, based on the determined prediction accuracies, OPE scores, and/or an ability to satisfy the constraints of a KPI and optimize the KPI output, the agent evaluation module 308 may output one or more agents 310. The one or more agent outputs 310 may execute one or more decisioning processes as to be described herein with respect to FIG. 4

Embodiments of a Decisioning Engine

Figure 4:
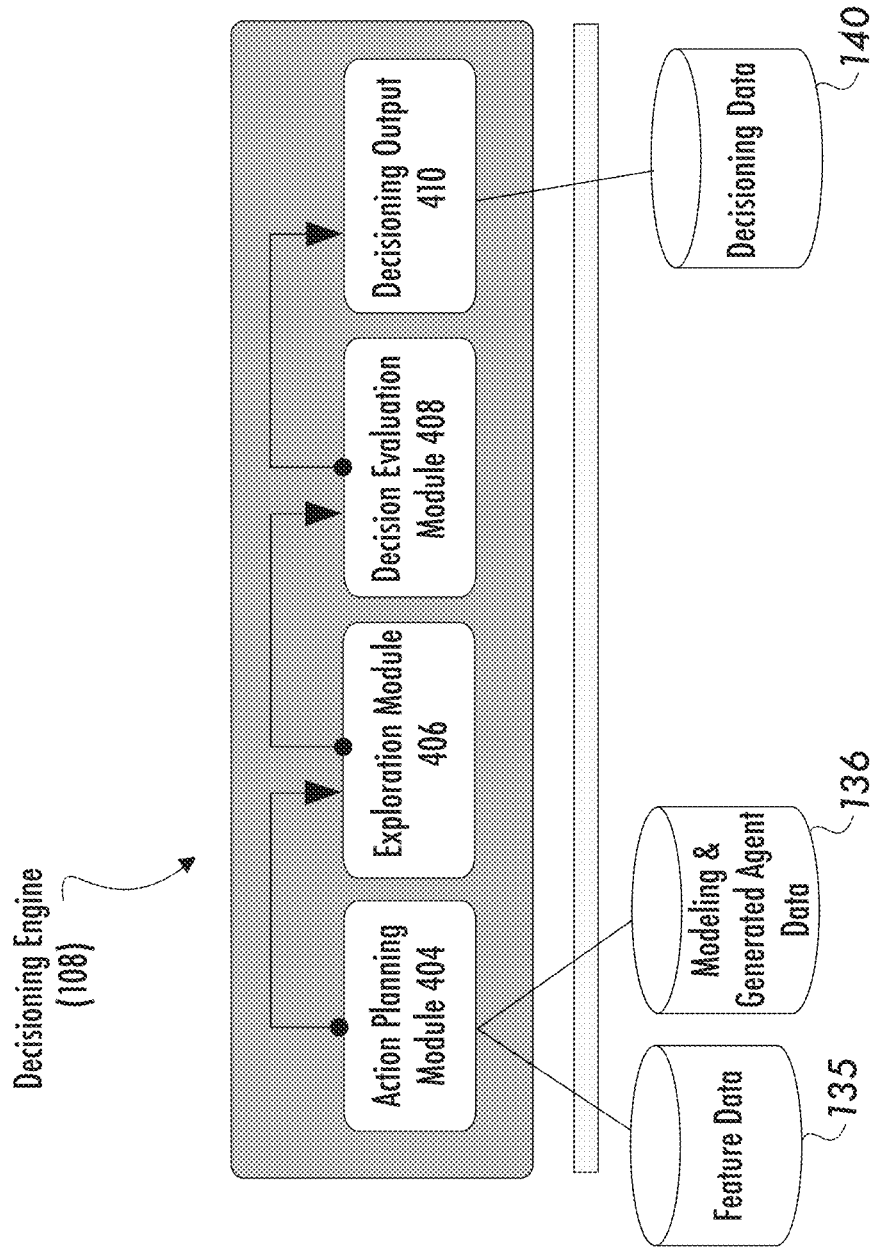
FIG. 4 shows a schematic diagram of an example decisioning engine for determining and applying decisioning operations to optimize an industrial process.

FIG. 4 shows a schematic diagram of an example decisioning engine 108 for determining and applying decisioning operations to optimize an industrial process. The decisioning engine 106 may have access to the feature data database 135 and the modeling and generated agent data database 136. The decisioning engine 108 may include one or more elements. Elements of the decisioning engine 108 may include an action planning module 404, an exploration module, and a decision evaluation module 408. Outputs of the decisioning engine 108 may include one or more decisioning data 410, each decisioning data corresponding to an action to be applied to the industrial system and/or communicated to a user via a UI component (e.g., the agent management UI 120b). Each action may be determined by the decisioning engine 108 such that application of the action to the industrial system optimizes the KPI(s). In some cases, decisioning data 410 may be stored by the decisioning data database 140.

In some implementations, the decisioning engine 108 may include an action planning module 404. The action planning module 404 may receive data inputs from the feature data database 135 and the modeling and generated agent data database 136. In some cases, the action planning module 404 may receive the agent(s) 310 as an input from the agent training engine 106. Using the received agent(s) 310 and the processed data sets 210 from the feature data database 135, the action planning module 404 may determine one or more actions (e.g., potential actions) to optimize the KPI(s) of the industrial process. Actions may be determined based on predictions provided by models included in the agent(s) 310 (if applicable). As described herein, the processed data sets 210 may include cleaned streaming data (e.g., originally derived from the streaming data database 134) from the equipment of the industrial system, where the cleaned streaming data may indicate a real-time or approximately real-time state of the industrial process. By receiving the processed data sets 210, the action planning module 404 may evaluate a current (or near current) state of the industrial process to determine one or more predictions regarding the future state of the industrial process (e.g., the future state of the KPI(s)). The processed data sets 210 that are indicative of the current state of the industrial process may be input to the agent(s) 310 in the action planning module 404. The agent(s) 310 may receive the processed data sets 210 and determine the prediction(s) regarding the future state of the industrial process based on model(s) included with and/or corresponding to the agents 310 (if applicable) and the processed data sets 210. The prediction(s) determined by the agent(s) 310 may or may not be input to the exploration module 406. Based on the determined prediction(s), the action planning module 404 may determine one or more actions (e.g., based on the predictions) that may be used (e.g., automatically or manually implemented) to optimize the KPI(s). The action(s) determined by the agent(s) 310 may be input to the exploration module 406.

In some implementations, the decisioning engine 108 may include an exploration module 406. The exploration module 406 may receive the prediction(s) and/or action(s) from the action planning module 404 as an input. The exploration module 406 may enable guided exploration of the received prediction(s) and/or action(s) from the action planning module 404. As an example, the exploration may enable guided exploration of predictions and actions that the optimization system has not previously encountered and/or experienced. In some cases, the exploration module 406 may include and/or otherwise have access to the agents 310. The agents 310 may convert the received prediction(s) to one or more actionable processes (i.e. "actions"), where an actionable process may be automatically applied to the equipment of the industrial process and/or provided (e.g., displayed) to a user (e.g., for application by the user). Based on receiving/determining the prediction(s) and/or action(s), the exploration module 406 may explore and/or otherwise determine a subset of the prediction(s) and/or action(s) that may correspond to an optimization of the KPI(s). An optimization of a KPI may be based on a type of the KPI. As an example, a type of a KPI may determine whether the KPI is minimized, maximized, or equilibrated at a configured value as a part of an optimization by the optimization system 100. Based on determining the subset of the predictions and/or actions that may correspond to optimization of the KPI(s), the exploration module 406 may map the subset of the predictions and/or actions to the agents 310, such that the agents 310 may determine the action(s) that may be used to realize the subset of the predictions for the industrial process. Accordingly, the exploration module 406 may explore the prediction(s) and action(s) that could be used to optimize the KPI(s). In some cases, a single prediction may be mapped to more than one action. The action(s) determined by the exploration module 406 may be provided as an input to the decision evaluation module 408.

In some implementations, the decisioning engine 108 may include a decision evaluation module 408. The decision evaluation module 408 may receive the action(s) from the exploration module 406. As described herein, the exploration module 406 may map more than one action to a prediction. Accordingly, the decision evaluation module 408 may determine which of the received actions may be output by the decisioning engine 108. The decision evaluation module 408 may evaluate the quality of the actions based on predicting the effect of implementing the actions on the industrial process. A quality of a particular action may be evaluated based on whether the predicted state of the industrial process corresponds to optimization of the KPI(s). In some cases, the decision evaluation module 408 may determine to output only one action (e.g., corresponding to one or more predictions). In some cases, the decision evaluation module 408 may determine to output more than one action (e.g., corresponding to one or more predictions). In some cases, the decision evaluation module 408 may determine not to output an action. As an example, the decision evaluation module 408 may not output an action if the action would result in a constraint violation for the industrial process. The decision evaluation module 408 may output the action(s) to optimize the KPI(s) as a decisioning output 410. The decisioning output 410 may be stored in a decisioning data database 140. To apply or communicate the decisioning output 410, the decisioning engine 108 may communicate the decisioning output 410 to the interface engine 102. In some cases, via the interface engine 102, the decisioning output 410 may be applied to equipment (e.g., control equipment) of the industrial process, such that the action(s) included in the decisioning output 410 may be automatically applied to optimize the KPI(s) of the industrial process. In some cases, via the interface engine 102, the decisioning output 410 may be provided to a user. The interface engine 102 may display the decisioning output 410 via a UI component (e.g., the process objective UI 120a or the agent management UI 120b) of the optimization system 100. In an example, the decisioning output 410 may displayed to a user via the agent management UI 120b, where the decisioning output 410 includes one or more instructions directing a user to apply the action(s) to the industrial process.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 5:
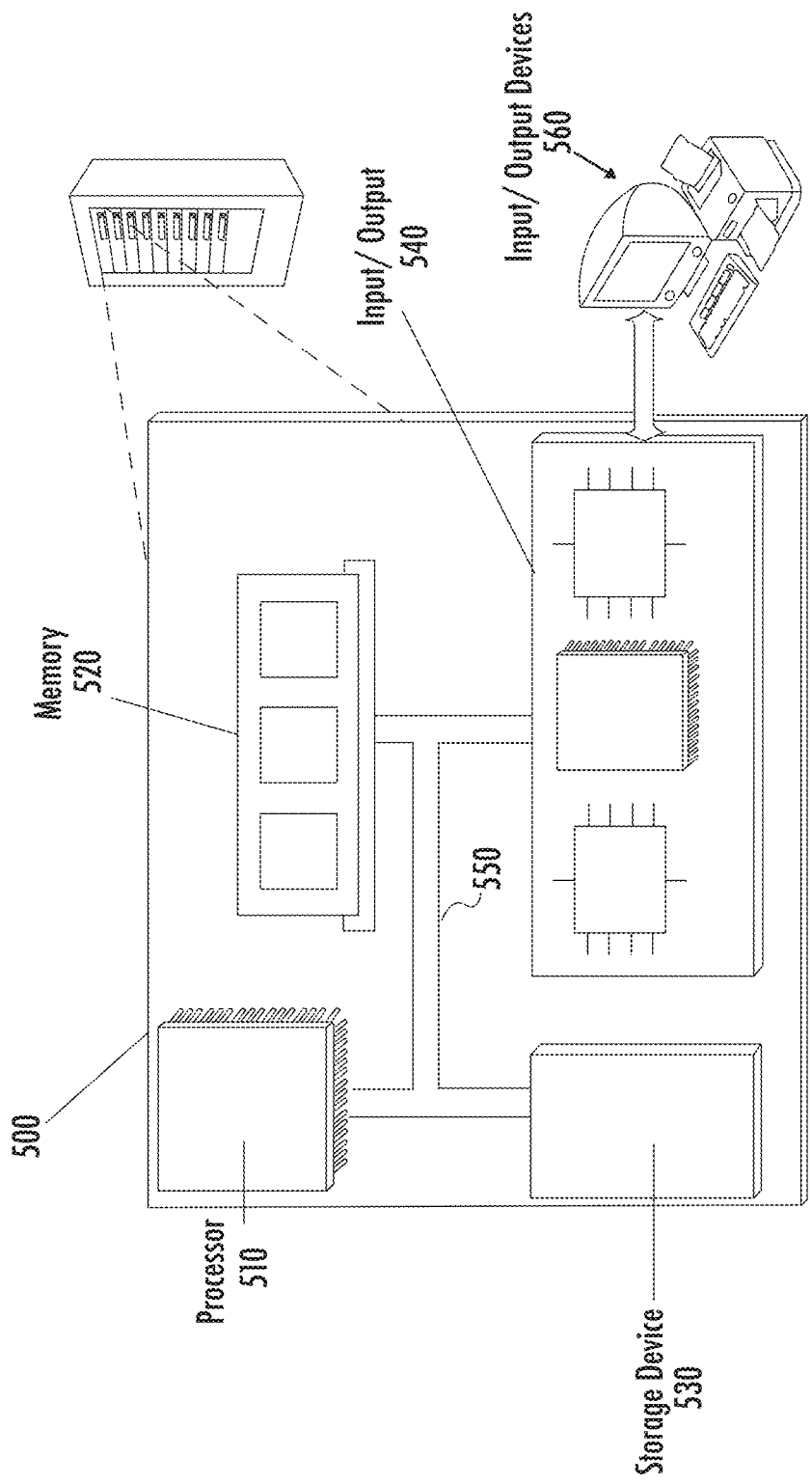
FIG. 5 is a block diagram of an example computer system that may be used in implementing the technology described herein.

FIG. 5 is a block diagram of an example computer system 500 that may be used in implementing the technology described in this document. General-purpose computers, network appliances, mobile devices, or other electronic systems may also include at least portions of the system 500. The system 500 includes a processor 510, a memory 520, a storage device 530, and an input/output device 540. Each of the components 510, 520, 530, and 540 may be interconnected, for example, using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530.

The memory 520 stores information within the system 500. In some implementations, the memory 520 is a non-transitory computer-readable medium. In some implementations, the memory 520 is a volatile memory unit. In some implementations, the memory 520 is a non-volatile memory unit.

The storage device 530 is capable of providing mass storage for the system 500. In some implementations, the storage device 530 is a non-transitory computer-readable medium. In various different implementations, the storage device 530 may include, for example, a hard disk device, an optical disk device, a solid-date drive, a flash drive, or some other large capacity storage device. For example, the storage device may store long-term data (e.g., database data, file system data, etc.). The input/output device 540 provides input/output operations for the system 500. In some implementations, the input/output device 540 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 560. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 530 may be implemented in a distributed way over a network, such as a server farm or a set of widely distributed servers, or may be implemented in a single computing device.

Although an example processing system has been described in FIG. 5, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computer-implemented method, comprising:
   generating at least one query for one or more key performance indicator (KPI) associated with an industrial process;
   displaying, at a user interface, the at least one query for the KPI associated with the industrial process;
   receiving, at the user interface, a first user input comprising the KPI associated with the industrial process;
   generating, based on the KPI, at least one query for information associated with the KPI;
   displaying, at the user interface, the at least one query for information associated with the KPI;
   receiving, at the user interface, a second user input comprising a response to the at least one query for information associated with the KPI;
   generating a custom objective function based on the response;
   generating processed datasets based on historical sensor data and real-time sensor data from equipment of the industrial process, wherein the historical sensor data is communicated from a historical database and the real-time sensor data is streamed from sensor components in real-time, and wherein the real-time sensor data comprises a set of chiller parameters;
   iteratively training, based on the objective function, an artificial intelligence agent to predict a state of the industrial process based on the processed datasets comprising the set of chiller parameters, wherein such iterative training improves an accuracy of the artificial intelligence agent;
   iteratively determining, by the artificial intelligence agent, a plan comprising a set of recommended actions for optimizing the KPI based on the predicted state of the industrial process, wherein the artificial intelligence agent comprises at least one of: a reinforcement learning agent, a neural network model, or a neural network model and search, and wherein the set of recommended actions comprises a set of chiller actions; and
   controlling the equipment of the industrial process based on the plan, comprising selectively activating or deactivating a chiller based on the set of chiller actions.

2. The method of claim 1, wherein the KPI comprises at least one of energy usage, product quality, product yield, or process stability.

3. The method of claim 2, wherein the KPI comprises at least one of a minimum energy usage or a maximum yield.

4. The method of claim 1, wherein the industrial process comprises at least one of a chemical manufacturing process, a heating and cooling process, a pharmaceutical manufacturing process, an oil and gas manufacturing process, a paper and pulp manufacturing process, a metal manufacturing process, a cement manufacturing process, a glass manufacturing process, or a power generation process.

5. The method of claim 1, wherein the first receiving step further comprises receiving, at the user interface, system characteristic information associated with one or more equipment that enable the industrial process.

6. The method of claim 5, wherein the system characteristic information comprises one or more of: a configuration of the equipment and sensors associated with the equipment.

7. The method of claim 5, wherein the at least one query for information associated with the KPI is based on both the KPI and the system characteristic information.

8. The method of claim 5, further comprising the step of:
receiving historical KPI data for the industrial process.

9. The method of claim 1, wherein the response to the at least one query for information associated with the KPI comprises process information.

10. The method of claim 9, further comprising the step of:
generating at least one additional query based on the received process information; and
displaying, at the user interface, the at least one additional query.

11. The method of claim 9, wherein the process information comprises one or more of an objective function that measures the KPI, a process variable associated with the objective function, or a constraint for the process variable.

12. The method of claim 11, wherein the process information further comprises an indication of how the objective function is measured.

13. The method of claim 12, where the process information further comprises an indication that the objective function is measurable by one or more equipment that enable the industrial process.

14. The method of claim 13, further comprising the steps of:
generating a query for a configuration of the one or more equipment;
displaying, at the user interface, the query for the configuration; and
receiving, based on a third user input at the user interface, the configuration.

15. The method of claim 13, wherein the process information further comprises an indication of whether the process variable is directly configured by the user or indirectly configured by the one or more equipment.

16. The method of claim 13, wherein the process information further comprises an indication of whether the constraint is local to a subset of the one or more equipment or global to the one or more equipment.

17. The method of claim 9, wherein the process information further comprises an indication of whether the constraint is statically independent of the industrial process or dynamically dependent on the industrial process.

18. The method of claim 9, wherein the process information further comprises an indication of whether the process variable is dependent on any additional process variables.

19. The method of claim 9, wherein the process information further comprises an indication of whether a constraint may be violated during the industrial process.

20. The method of claim 11, further comprising the steps of:
determining, from the process information and using a dimensionality reduction, one or more effective process variable for optimizing the objective function.

21. The method of claim 20, further comprising the step of:
causing display, at the user interface, of the effective process variable.

22. The method of claim 1, wherein the plan for optimizing the KPI comprises a user action.

23. The method of claim 22, further comprising the step of:
causing display, at the user interface, of an indication of the user action.

24. The method of claim 1, further comprising the step of:
determining a capability of the artificial intelligence agent to generate the plan for optimizing the KPI.

25. The method of claim 24, further comprising the step of:
causing display, at the user interface, of an indication of the capability of the artificial intelligence agent.

26. The method of claim 1, wherein the determining step further comprises:
receiving sensor data indicative of a state of the industrial process, wherein the sensor data is associated with one or more equipment that enable the industrial process; and
generating, by the artificial intelligence agent, the plan for optimizing the KPI based on the sensor data and the predicted state of the industrial process.

27. A system comprising:
one or more data processing apparatus programmed to perform operations comprising:
generating at least one query for one or more key performance indicator (KPI) associated with an industrial process;
displaying, at a user interface, the at least one query for the KPI associated with the industrial process;
receiving, at the user interface, a first user input comprising the KPI associated with the industrial process;
generating, based on the KPI, at least one query for information associated with the KPI;
displaying, at the user interface, the at least one query for information associated with the KPI;
receiving, at the user interface, a second user input comprising a response to the at least one query for information associated with the KPI;
receiving a mapping between a semantic element of an objective function and an equipment data stream from a set of equipment of the industrial process;
constantly receiving the equipment data stream for the set of equipment, the equipment data stream comprising a set of chiller parameters;
iteratively training, based on the response, the mapping, and the equipment data stream, an artificial intelligence agent to predict a future state of the industrial process, wherein such iterative training improves an accuracy of the artificial intelligence agent;
iteratively determining, by the artificial intelligence agent, a plan for optimizing the KPI based on the predicted future state of the industrial process, wherein the plan comprises a set of recommended actions, wherein the set of recommended actions comprises a set of chiller actions, wherein the artificial intelligence agent comprises at least one of: a reinforcement learning agent, a neural network model, or a neural network model and search algorithm, and controlling the set of equipment of the industrial process based on the plan, comprising selectively activating or deactivating a chiller based on the set of chiller actions.

28. The system of claim 27, wherein the KPI comprises at least one of energy usage, product quality, product yield, or process stability.

29. The system of claim 28, wherein the KPI comprises at least one of a minimum energy usage or a maximum yield.

30. The system of claim 27, wherein the industrial process comprises at least one of a chemical manufacturing process, a heating and cooling process, a pharmaceutical manufacturing process, an oil and gas manufacturing process, a paper and pulp manufacturing process, a metal manufacturing process, a cement manufacturing process, a glass manufacturing process, or a power generation process.

31. A method comprising:
generating an objective function based on a set of KPIs received from a set of users;
receiving a set of equipment data streams from a set of equipment of an industrial process in real-time, wherein the set of equipment comprises a pump and the equipment data stream comprises a set of pump data;
determining a mapping between a set of semantic elements of the objective function and the set of equipment data streams;
iteratively training, based on the objective function and the mapping, an artificial intelligence agent to predict a future state of the industrial process;
predicting the future state of the industrial process based on the set of equipment data streams;
iteratively determining a plan for optimizing the set of KPIs based on the future state of the industrial process, wherein the plan comprises a set of pump actions; and
controlling the set of equipment based on the plan, comprising controlling the pump based on the set of pump actions.

32. The method of claim 31, further comprising deactivating the pump based on the set of pump actions.

33. The method of claim 1, wherein the chiller action comprises adjusting a temperature of the chiller.

* * * * *